(12) United States Patent
Li

(10) Patent No.: US 8,477,237 B2
(45) Date of Patent: Jul. 2, 2013

(54) PORTABLE ELECTRONIC DEVICE WITH ADJUSTABLE CAMERA

(75) Inventor: Jian-Hui Li, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 282 days.

(21) Appl. No.: 13/010,979

(22) Filed: Jan. 21, 2011

(65) Prior Publication Data
US 2012/0120299 A1    May 17, 2012

(30) Foreign Application Priority Data
Nov. 12, 2010   (CN) .......................... 2010 1 0541559

(51) Int. Cl.
*H04N 5/225*     (2006.01)
*H04N 7/18*      (2006.01)
*H04M 1/00*      (2006.01)

(52) U.S. Cl.
USPC ...... 348/373; 348/158; 455/556.1; 455/575.1

(58) Field of Classification Search
USPC .............. 348/61, 82–85, 143, 158, 373–376; 455/575.1, 575.7, 90.3, 556.1, 556.2, 550.1, 455/73; 353/63–67, 119–122; 403/180–184, 403/91

See application file for complete search history.

(56) References Cited

U.S. PATENT DOCUMENTS

| | | | |
|---|---|---|---|
| 7,637,466 B2 * | 12/2009 | Dillard | 248/280.11 |
| 2005/0237425 A1 * | 10/2005 | Lee et al. | 348/373 |
| 2009/0002548 A1 * | 1/2009 | Liang et al. | 348/373 |

* cited by examiner

*Primary Examiner* — Sinh Tran
*Assistant Examiner* — Mark Monk
(74) *Attorney, Agent, or Firm* — Altis Law Group, Inc.

(57) ABSTRACT

A portable electronic device includes a main body, a camera electrically connected to the main body, and a holder assembly. The holder assembly includes a first connecting beam, a second connecting beam, and a third connecting beam. The second connecting beam is rotatably connected to an end of the first connecting beam and an end of the third connecting beam. The camera is rotatably assembled on the other end of the first connecting beam, and the other end of the third connecting beam rotatably is connected to the main body.

10 Claims, 5 Drawing Sheets

PORTABLE ELECTRONIC DEVICE WITH ADJUSTABLE CAMERA

BACKGROUND

1. Technical Field

The present disclosure relates to portable electronic devices, and particularly, to a portable electronic device with adjustable camera.

2. Description of Related Art

A typical portable electronic device includes a camera secured thereon. When a user wants to take a picture by the portable electronic device, the user has to adjust the portable electronic device to take photos from different angles. The user's hand may easily shake when taking photos from a special angle. It's inconvenient to the user to take high quality photos.

Therefore, there is room for improvement within the art.

BRIEF DESCRIPTION OF THE FIGURES

Many aspects of the portable electronic device can be better understood with reference to the following figures. The components in the figures are not necessarily drawn to scale, the emphasis instead being placed upon clearly illustrating the principles of the portable electronic device. Moreover, in the drawings like reference numerals designate corresponding parts throughout the several views.

DETAILED DESCRIPTION

Figure 1:
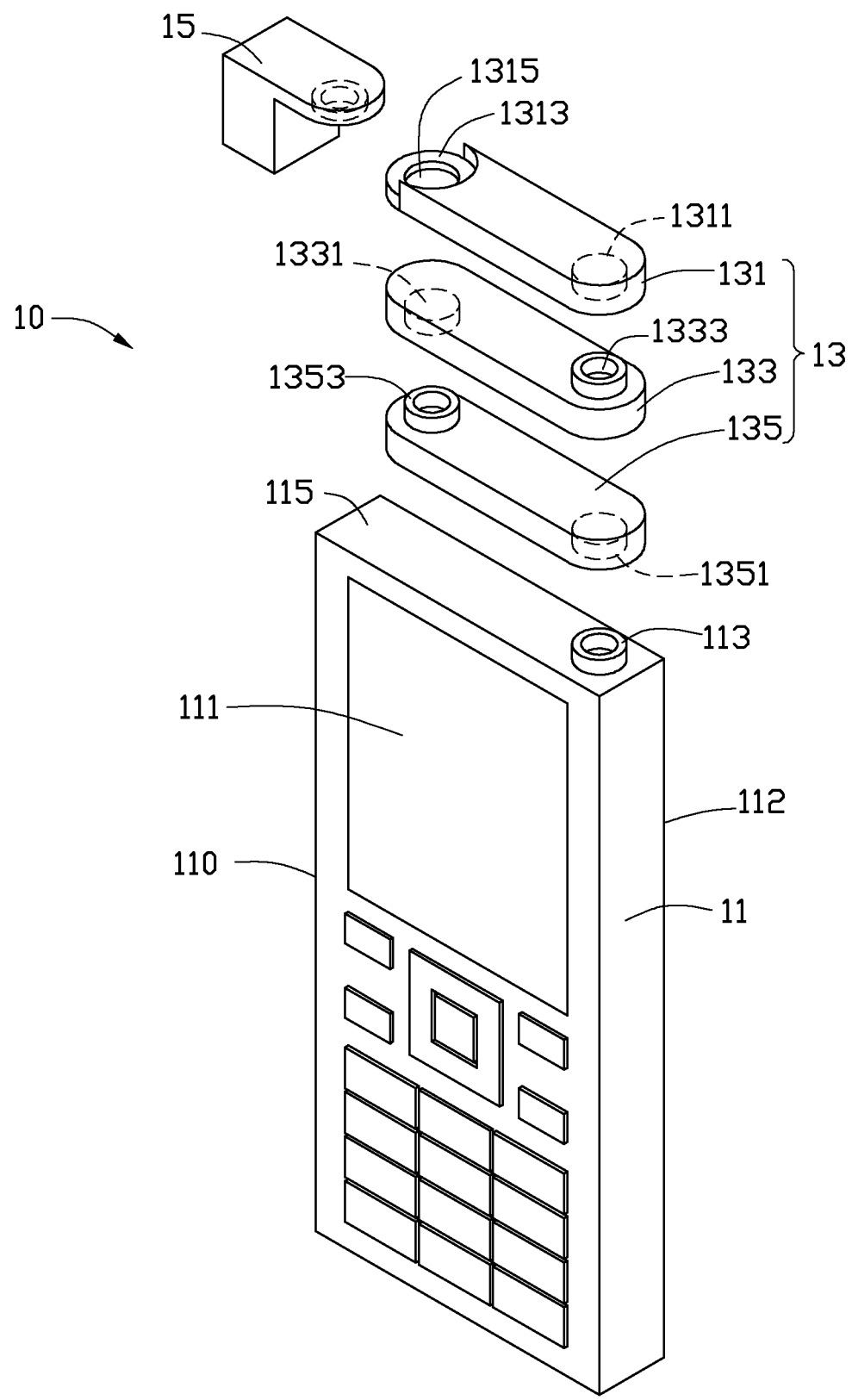
FIG. 1 is an exploded, isometric view of an exemplary embodiment of a portable electronic device.

FIG. 1 shows an exemplary portable electronic device 10 including a main body 11, a holder assembly 13, and a camera 15. One free end of the holder assembly 13 is fixed on the main body 11 and the camera 15 is fixed on the other free end of the holder assembly. The camera 15 is electrically connected to the main body 11 by data lines (not shown). The relative position between the camera 15 and the main body 11 can be adjusted by moving the holder assembly 13.

The main body 11 includes a first surface 110, a second surface 112, and a top end 115. The first surface 110 is opposite to the second surface 112. A display screen 111 is positioned on the first surface 110. A first barrel 113 is positioned on the top end 115. The holder assembly 13 can be rotatably assembled to the first barrel 113. The first barrel 113 is substantially cylindrical.

The holder assembly 13 includes at least one connecting beam. In the exemplary embodiment, the holder assembly 13 includes a first connecting beam 131, a second connecting beam 133, and a third connecting beam 135. The first connecting beam 131 defines a first depression 1311 facing the second connecting beam 133. An end of the first connecting beam 131 includes a concave portion 1313 opposite to the first depression 1311. The concave portion 1313 defines a through hole 1315 for assembling the camera 15.

The second connecting beam 133 defines a second depression 1331 facing the third connecting beam 135. A second barrel 1333 is positioned on an end of the second connecting beam 133 opposite to the second depression 1331. The second barrel 1333 can be rotatably assembled in the first depression 1311.

The third connecting beam 135 has the same configuration as the second connecting beam 133. The third connecting beam 135 defines a third depression 1351 facing the first barrel 113. The first barrel 113 can be rotatably assembled in the third depression 1351. A third barrel 1353 is positioned on an end of the third connecting beam 135 opposite to the third depression 1351. The third barrel 1353 can be rotatably assembled in the second depression 1331.

Figure 2:
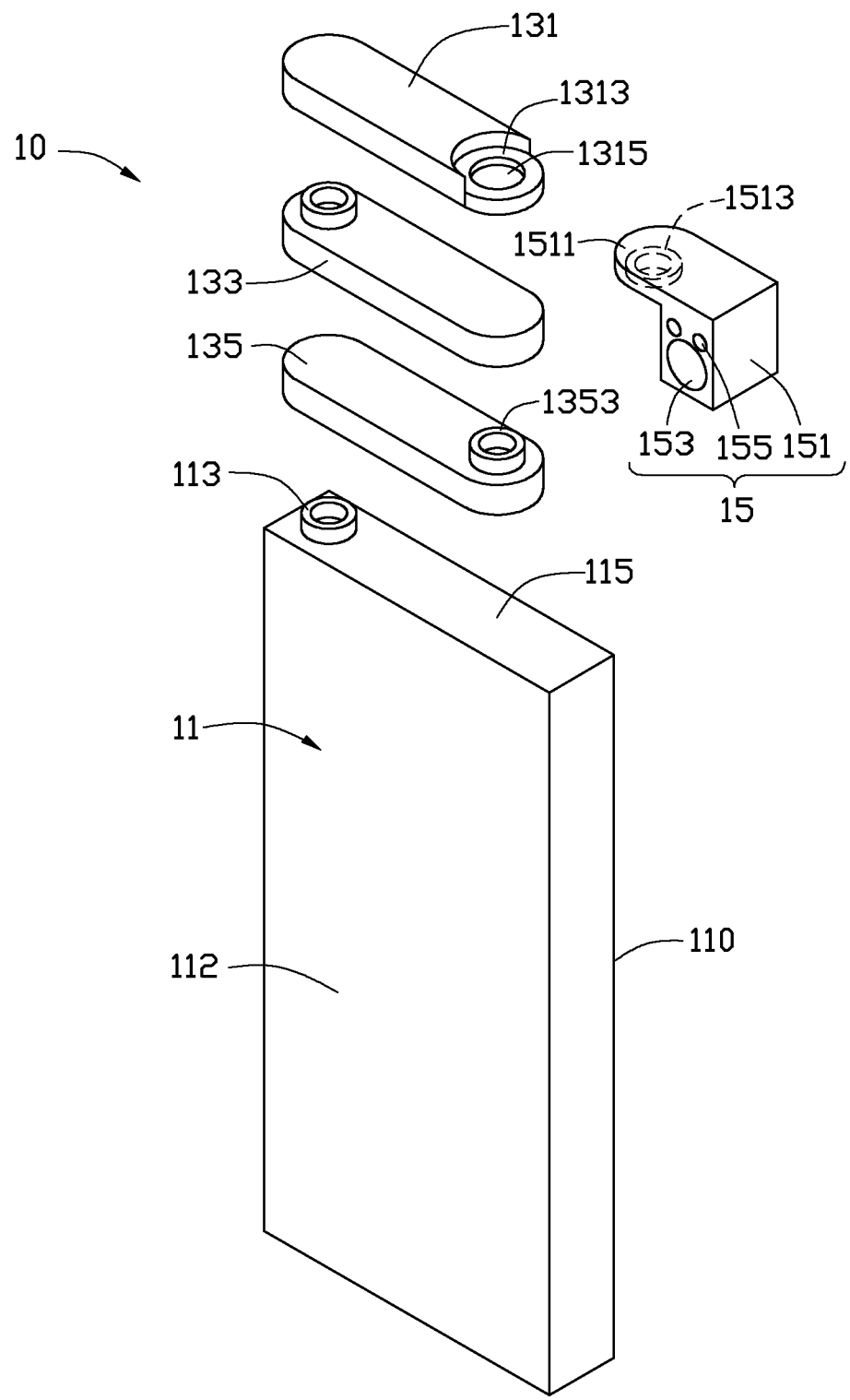
FIG. 2 is an exploded, isometric view of the portable electronic device, but shown from another angle.

Referring to FIG. 2, the camera 15 includes a main portion 151, a lens 153, and a LED lamp 155. The main portion 151 may be substantially rectangular, and have an extending portion 1511 extending from an end thereof. The extending portion 1511 includes a post 1513 for being rotatably assembled in the through hole 1315. The lens 153 and the LED lamp 155 are positioned on the same surface of the main portion 151. In the exemplary embodiment, the lens 153 and the LED lamp 155 are positioned a surface opposite to the display screen 111. The LED lamp 155 is configured for providing light source to the camera 15 when the camera 15 is being used in low light conditions.

Figure 3:
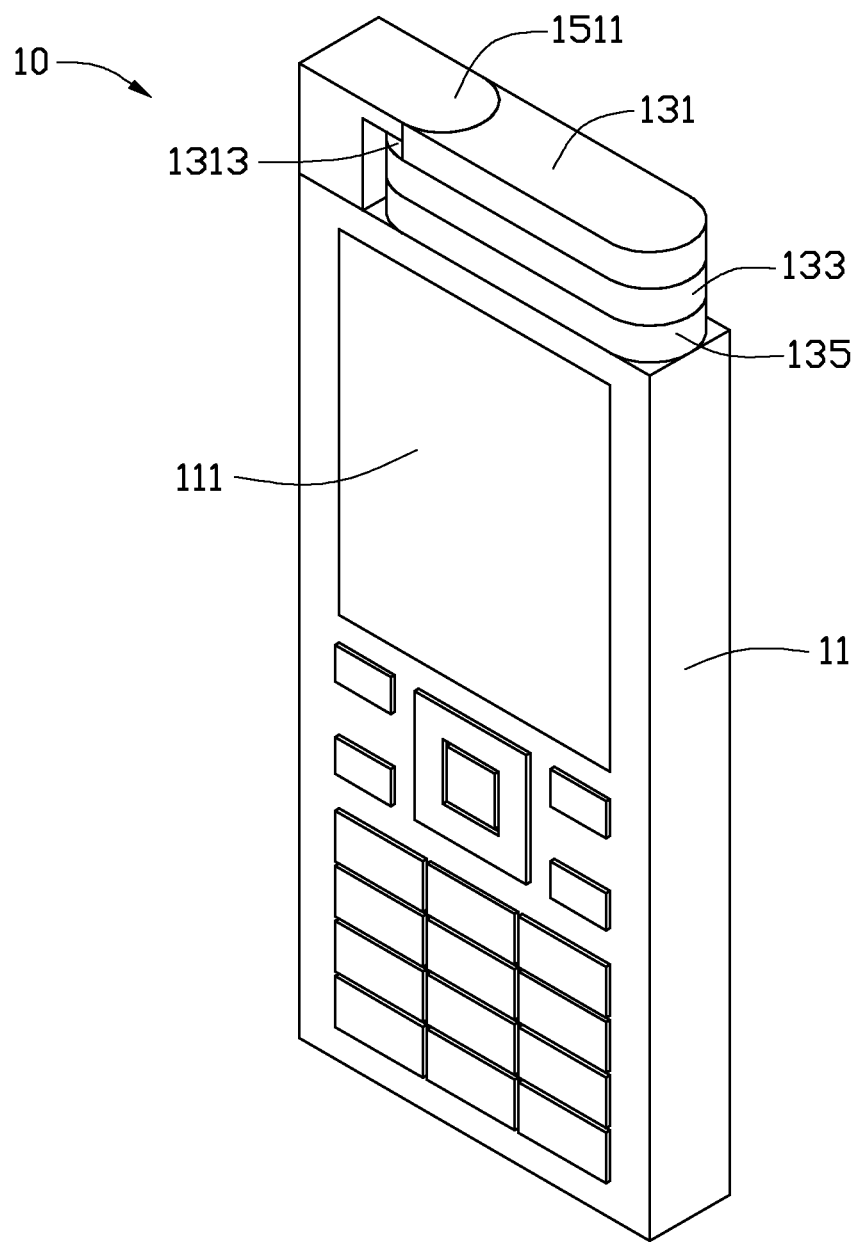
FIG. 3 is an assembled view of the portable electronic device.

Referring FIG. 1 to FIG. 3, when the portable electronic device 10 is to be assembled, the first barrel 113 is rotatably received in the third depression 1351. Then, the third barrel 1353 and the second barrel 1333 are respectively rotatably received in the second depression 1331 and the first depression 1311. Therefore, the first connecting beam 131, the second connecting beam 133, and the third connecting beam 135 can rotate relative to each other. Finally, the extending portion 1511 engages with the concave portion 1313, and the post 1513 is rotatably received in the through hole 1315. Therefore, the camera 15 is rotatably assembled to the main body 11 by the holder assembly 13. When the camera 15 is not in use, the third connecting beam 135, the second connecting beam 133, and the first connecting beam 131 stack in parallel on the top end 115, and an end of the camera 15 resists the top end 115.

Figure 4:
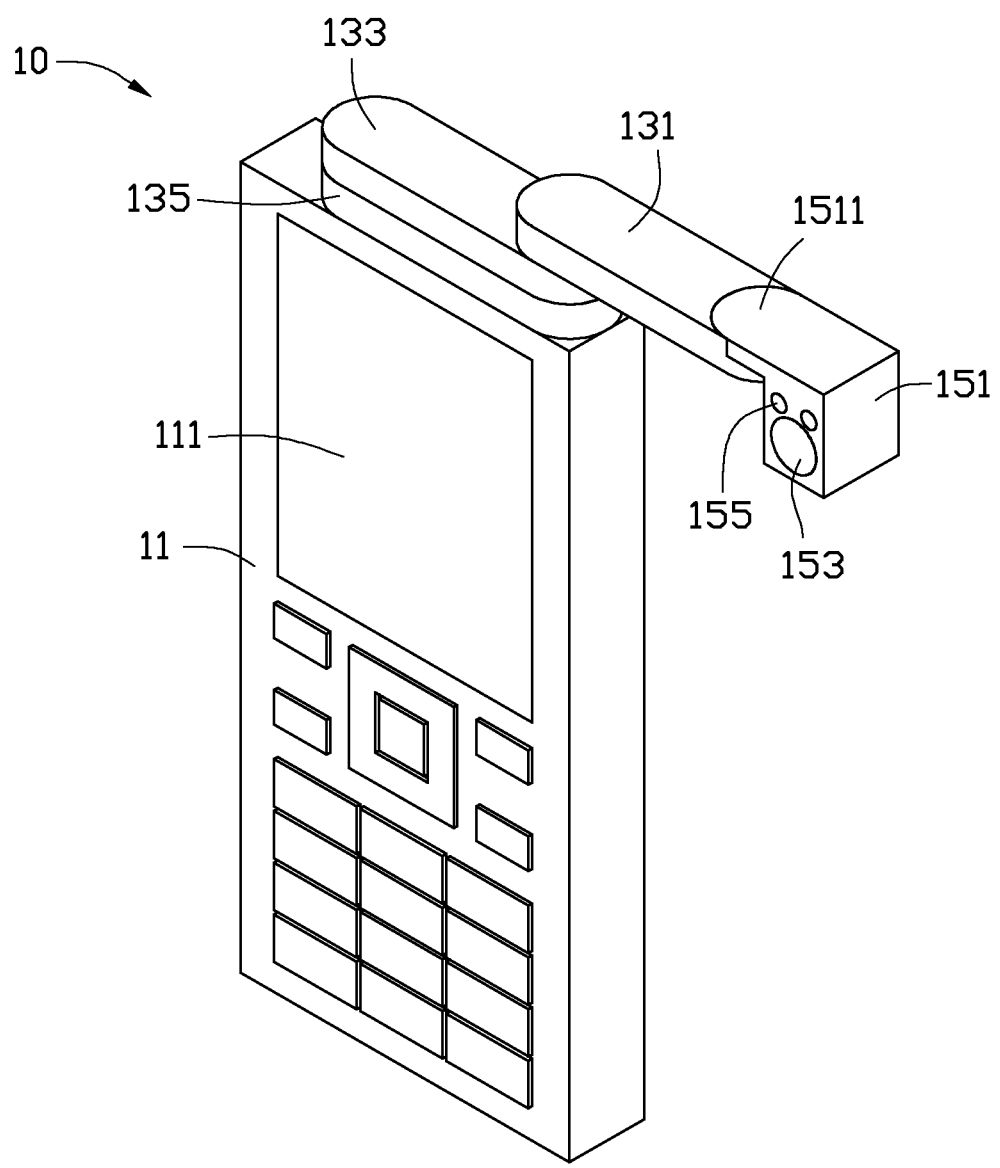
FIG. 4 is an isometric view of the portable electronic device shown in a using condition.
Figure 5:
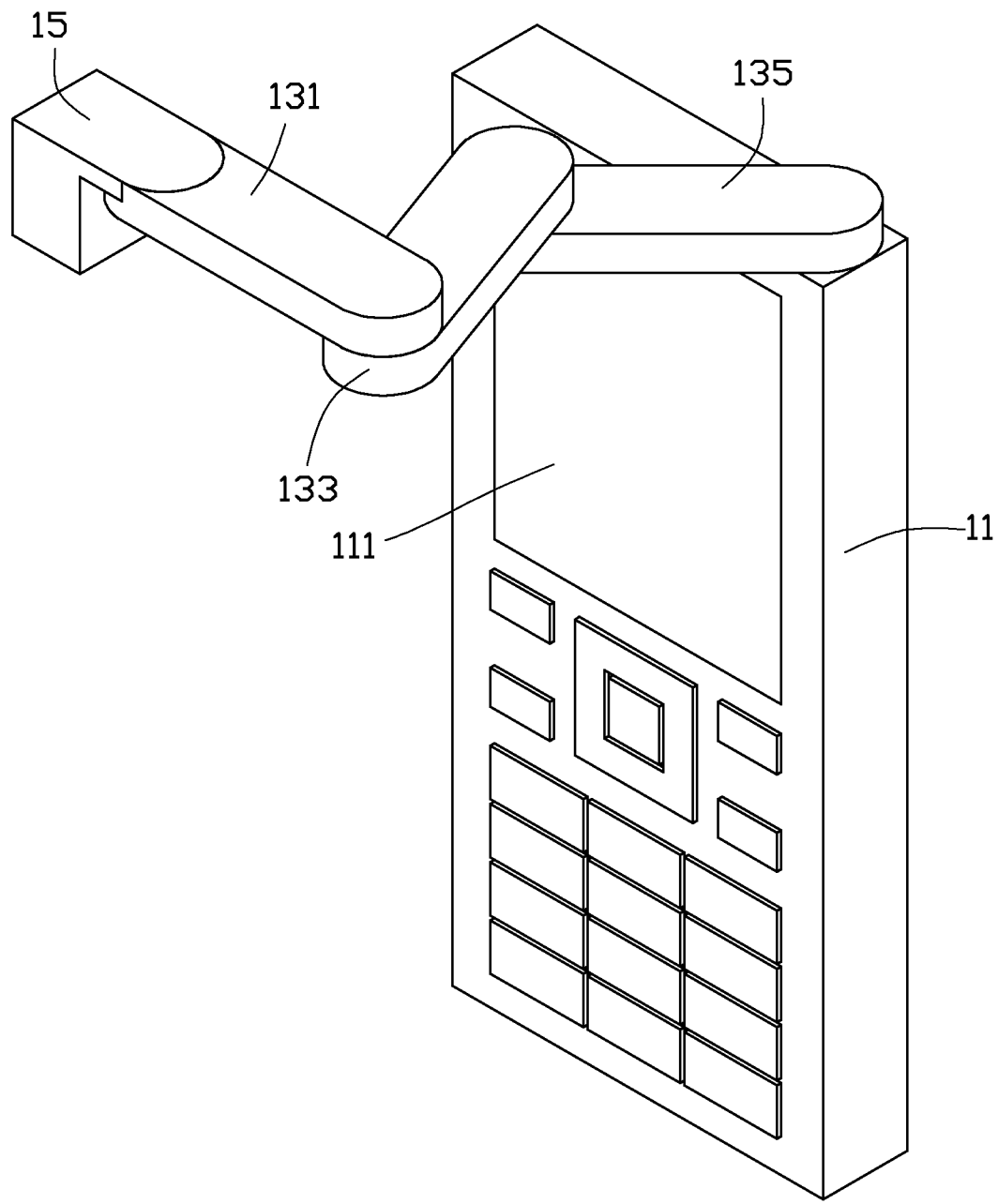
FIG. 5 is an isometric view of the portable electronic device shown in the other using condition.

Referring FIG. 4 and FIG. 5, when using the camera 15 to take a picture, the camera 15 is rotated, or the camera 15, and any or all of the first connecting beam 131, the second connecting beam 133, and the third connecting beam 135 can be rotated relative to each other to adjust the direction in which lens 15 is facing. Therefore, it is convenient to the user to take pictures from different angles.

In another embodiment, the third connecting beam 135 can be omitted, the first barrel 113 can be rotatably assembled in the second depression 1331. The second connecting beam 133 can be omitted, and the third barrel 1353 can be rotatably assembled in the first depression 1311. Furthermore, the second connecting beam 133 also can be omitted with the third connecting beam 135. The first barrel 113 can be rotatably assembled in the first depression 1311.

It should be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A portable electronic device, comprising:
a main body comprising a first barrel positioned thereon;
a camera comprising a post; and
a holder assembly comprising a first connecting beam defining a first depression and a through hole, a second connecting beam defining a second depression, a second barrel positioning on the second connecting beam;
wherein the first barrel and the second barrel are respectively rotatable assembled in the second depression and the first depression; the post is rotatably received in the through hole.

2. The portable electronic device as claimed in claims 1, wherein the first connecting beam includes a concave portion, the through hole is defined in the concave portion; the camera comprises a main portion and an extending portion extending from an end thereof, the post is positioned on the extending portion, the extending portion engages with the concave portion.

3. The portable electronic device as claimed in claim 2, wherein the camera comprises a lens and a LED lamp positioned on the same surface of the main portion.

4. A portable electronic device, comprising:
a main body comprising a first barrel positioned thereon;
a camera electrically connected to the main body and comprising a post;
and a holder assembly comprising a first connecting beam defining a first depression and a through hole,
a second connecting beam defining a second depression, and a third connecting beam defining a third depression, a second barrel positioning on the second connecting beam,
and a third barrel positioning on the third connecting beam;
wherein the first barrel, the second barrel, and the third barrel are respectively rotatably assembled in the third depression, the first depression, and the second depression;
the post is rotatably received in the through hole.

5. The portable electronic device as claimed in claim 4, wherein the first connecting beam includes a concave portion, the through hole is defined in the concave portion; the camera comprises a main portion and an extending portion extending from an end thereof, the post is positioned on the extending portion, the extending portion engages with the concave portion.

6. The portable electronic device as claimed in claim 5, wherein the camera comprises a lens and a LED lamp positioned on the same surface of the main portion.

7. The portable electronic device as claimed in claim 1, wherein the main body comprises a first surface, a second surface opposite to the first surface, and a top end connecting the first surface to the second surface; the first barrel is positioned on the top end.

8. The portable electronic device as claimed in claim 7, wherein when the camera is not in use, the second connecting beam, and the first connecting beam stack in parallel on the top end, and an end of the camera resists the top end.

9. The portable electronic device as claimed in claim 4, wherein the main body comprises a first surface, a second surface opposite to the first surface, and a top end connecting the first surface to the second surface; the first barrel is positioned on the top end.

10. The portable electronic device as claimed in claim 9, wherein when the camera is not in use, the third connecting beam, the second connecting beam, and the first connecting beam stack in parallel on the top end, and an end of the camera resists the top end.

* * * * *